United States Patent [19]

Foreman

[11] Patent Number: 4,854,349

[45] Date of Patent: Aug. 8, 1989

[54] SEWAGE DRAINING DEVICE FOR RECREATIONAL VEHICLES OR THE LIKE

[76] Inventor: Dennis Foreman, R.R. 3, Box 15, Fairland, Ind. 46126

[21] Appl. No.: 43,329

[22] Filed: Apr. 28, 1987

[51] Int. Cl.$^4$ ............................................. F16K 27/12
[52] U.S. Cl. ...................................... 138/89; 137/899; 137/355.16; 138/107; 138/119; 285/62; 285/402; 285/901
[58] Field of Search .................... 4/321; 138/89, 103, 138/107, 109, 114, 121, 119; 248/49, 58, 60; 137/351, 354, 355.19, 899; 285/7, 45, 62, 396, 402, 235, 236, 961

[56] References Cited

U.S. PATENT DOCUMENTS

| | | | |
|---|---|---|---|
| 2,531,401 | 11/1950 | Clerke | 285/918 X |
| 4,133,347 | 1/1979 | Mercer | 4/321 X |
| 4,231,595 | 11/1980 | Knutsen | 285/62 |
| 4,607,866 | 8/1986 | Erlichman | 285/381 X |

Primary Examiner—William A. Cuchlinski, Jr.
Attorney, Agent, or Firm—Woodard, Emhardt, Naughton Moriarty & McNett

[57] ABSTRACT

A sewage draining device having a drain coupling, an independently suspended tubular housing, a flexible, extendable drain hose and a dual closure cap. In storage, the hose is fully retracted within the housing with the dual closure cap closing both the hose and the housing. For drainage, the dual closure cap is disengaged from the housing and the cap/hose combination may then be extended from the housing to a sewage receiving tank. The dual closure cap is then removed from the hose for drainage. The drain coupling and the housing, while connected to each other to complete the closure of the hose in storage, are independently suspended from the vehicle, whereby the device will withstand transportation without incurring damage or causing damage to the vehicle.

2 Claims, 1 Drawing Sheet

SEWAGE DRAINING DEVICE FOR RECREATIONAL VEHICLES OR THE LIKE

FIELD OF THE INVENTION

The present invention relates to the field of sewage draining devices, and more particularly to a sewage draining device for recreational vehicles or the like.

BACKGROUND OF THE INVENTION

The enjoyment of outdoor living and of traveling by road to see the country have contributed to the popularity of recreational vehicles (RVs) in our society. Along with the benefits and enjoyment of RV living, however, come certain unpleasant maintenance jobs, such as emptying and cleaning the vehicle's sewage system.

Present RV sewage systems often include a flexible drain hose which is stored in a hollow receiving area within the bumper of the vehicle. The hose must be taken out and connected at one end to a fitting on or in communication with the vehicle's holding tank. The opposite end of the hose is then extended to an appropriate sewage receiving facility. After drainage is complete, the hose is detached from the tank, rinsed out, coiled up or retracted, and stored until the next use. Each time the tank is to be drained, the entire hose must be removed from the bumper, attached, maneuvered to the receiving tank, detached, cleaned and re-stored back in the bumper. The inherent awkwardness of handling these ten or twenty foot flexible drain hoses makes this maintenance task particularly difficult and unpleasant. What is needed is a sewage draining device which is inexpensive, easy to handle, easy to clean, easy to manipulate and easy to store.

SUMMARY OF THE INVENTION

Generally speaking, there is provided a self-contained sewage drainage unit requiring no connections or awkward manipulations and only minimal handling. According to one embodiment, a sewage draining device has a drain coupling, an independently suspended tubular housing, a flexible, extendable drain hose and a dual closure cap. In storage, the hose is fully retracted within the housing with the dual closure cap closing both the hose and the housing. For drainage, the dual closure cap is disengaged from the housing and the cap-hose combination may then be extended from the housing to a sewage receiving tank. The dual closure cap is then removed from the hose for drainage. The drain coupling and the housing, while connected to each other to complete the closure of the hose during storage, are independently suspended from the vehicle, whereby the device will withstand transportation without incurring damage or causing damage to the vehicle.

It is an object of the present invention to provide a sewage drain device which is easy to use with minimal risk of soiling to the user.

It is another object of the present invention to provide a sewage drain device which is conveniently placed and stored compactly.

It is a further object of the present invention to provide such a device that will store during travel without incurring damage or causing damage to the vehicle.

Further objects and advantages of the present invention will be apparent from the following description.

DESCRIPTION OF THE PREFERRED EMBODIMENT

Figure 1:
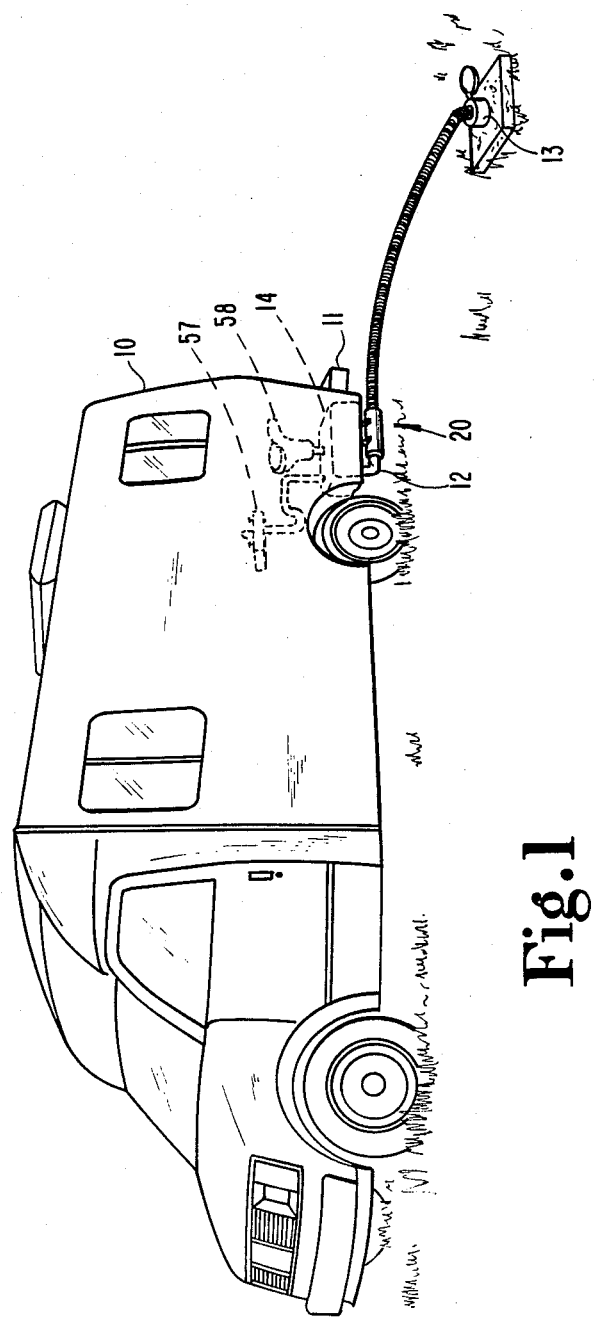
FIG. 1 is a perspective view of the sewage draining device in use with a recreational vehicle in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a sewage draining device 20 adapted for use with a recreational vehicle 10 in accordance with one embodiment of the present invention. In conventional systems, a ten or twenty foot length (extended) of flexible drainage hose would often be stored in a special hollow bumper 11 proximal to the holding tank outlet coupling 12. The entire hose would be removed from bumper 11, connected at one end to outlet coupling 12 and the other end would be inserted into the sewage receptacle 13.

Figure 2:
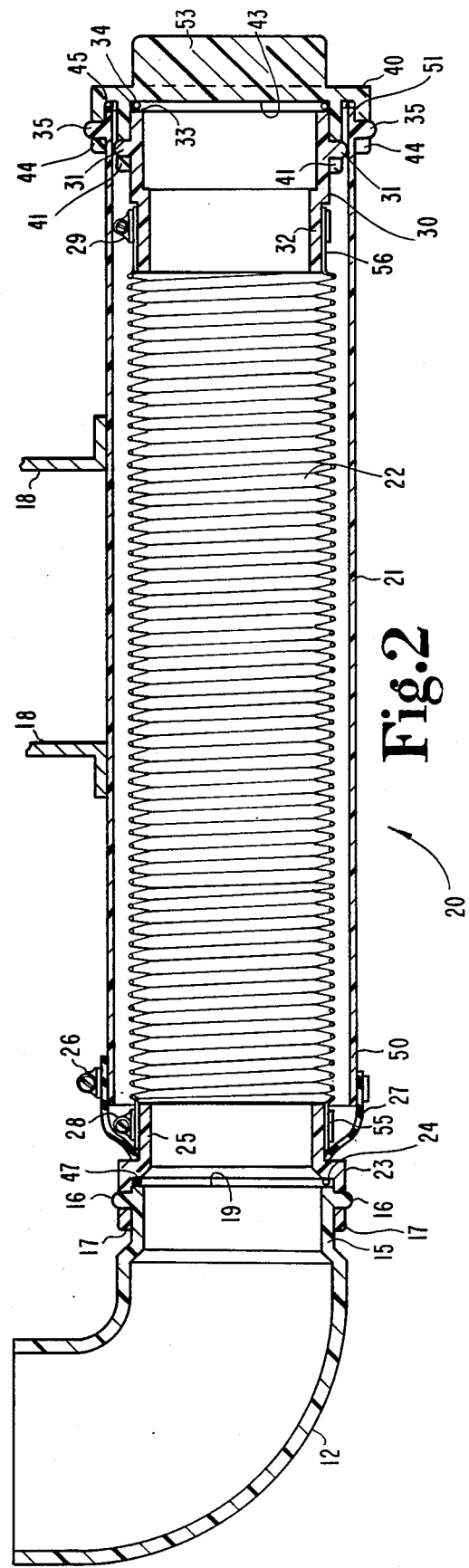
FIG. 2 is a side, cross-sectional view of the sewage draining device of FIG. 1 in a stored and sealed condition.

As shown in FIG. 2, draining device 20 includes a cylindrical housing 21, an extendible, accordian-type sewer hose 22, drain coupling 23, damping connector 27, termination filling 30 and dual closure cap 40. Outlet coupling 12 is in direct communication with a sewage holding tank 14 of RV 10. Outlet coupling 12 is elbowed to provide a horizontally, rearwardly extending portion 15 to receive drain coupling 23. Although draining device 20 is fixedly secured to RV 10 by a pair of brackets 18, a bayonet-coupling relationship is provided between portion 15 and drain coupling 23 to facilitate replacement or repair of draining device 20. Comprising a first bayonet assembly is rearwardly extending portion 15 which has at least two radially spaced, outwardly extending bayonet pins 16 which mate with forwardly extending bayonet hooks 17 of drain coupling 23. To provide a tight sealing relationship between draining device 20 and outlet coupling 12, the outside diameter of portion 15 is approximately identical to the inside diameter of drain coupling 23. Additionally, an O-ring 47 is fixed in an appropriate manner such as gluing to interior annular ledge 24 of drain coupling 23. A flat annular surface 19, defined by the end of portion 15, is compressively received adjacent O-ring 47 upon engagement and tightening of the bayonet assembly, forming a liquid-tight seal therewith.

Due to the high frequency and magnitude of vibrations and bumps imposed by the road upon the RV, relative forces among the holding tank 14, sewage draining device 20 and other related elements within RV 10 (due primarily to their location at the rear of the RV) can damage the draining device. A shock-absorbing damping connector 27 is provided between housing 21 and drain coupling 23 to reduce the risk of damage. Damping connector 27 is made of a tubular, resilient material such as rubber and is attached at one end in tight, encircling engagement to the neck 25 of drain coupling 23. At its other end, damping connector 27 is likewise attached in tight, encircling engagement with the forward end 50 of housing 21. Damping connector 27 may be fixed to neck 25 and housing 21 by any means suitable to contain odors or leaking waste. In the preferred embodiment, damping connector 27 is shrink fit to neck 25 and secured to housing 21 by clamp 26. This allows easy replacement of damaged or faulty subparts of device 20.

The outer diameter of neck 25 is sufficiently smaller than the inside diameter of housing 21 to allow one end 55 of sewer hose 22 to encircle neck 25 within housing 21. End 55 of sewer hose 22 is sized to fit snugly around neck 25 and is held thereagainst by appropriate fluid-tight sealing means. In the present embodiment, hose clamp 28 holds end 55 of hose 22 tightly around neck 25.

Housing 21 is long enough to receive the entire length of hose 22 in its retracted position, plus several more inches to receive the various couplings and fittings. Housing 21 is suspendedly secured to the underside of RV 10 by a pair of suitable brackets 18. The attachment of brackets 18 to RV 10 or to housing 21 is detachable to permit replacement or repair of draining device 20.

Sewer hose 22 is received at its opposite end 56, in liquid-tight engagement, around neck 32 of termination fitting 30. In the present embodiment, hose clamp 29 holds end 56 tightly around neck 32. Hose 22, neck 25 of drain coupling 23 and termination fitting 30 are each sized to fit freely within housing 21.

Dual closure cap 40 serves a dual function using a bayonet system of sealing to close off both termination fitting 30 and housing 21. Forwardly extending, interior bayonet hooks 41 of cap 40 are ramped and sized to lockingly engage with radially extending bayonet pins 31 of termination fitting 30. Flat annular surface 33, defined by the rearward termination of fitting 30, forms a seal with O-ring 34, which is fixedly disposed against flat inner wall 43 of cap 40. Engagement and tightening of hooks 41 with pins 31 compresses O-ring 34 between annular surface 33 and inner wall 43 forming a liquid tight seal.

Similar forwardly extending, exterior bayonet hooks 44 of cap 40 and radially extending bayonet pins 35 of housing 21 hold cap 40 locked in a liquid-tight, closing position onto rearward end 51 of housing 21. O-ring 45 is disposed between end 51 and cap 40 to provide a liquid-tight seal. It may be desirable to omit O-ring 45 to leave a small air gap between cap 40 and housing 21 to permit evaporation of residual moisture within housing 21. A flat, rearwardly extending handle 53 is provided for grasping cap 40.

Use of the sewage draining device would be as follows:

With the sewage receptacle 13 within the maximum reach of extendable sewer hose 22, cap 40 is twisted (preferably counter-clockwise) by handle 53, thus disengaging exterior bayonet hooks 44 from exterior bayonet pins 35. Cap 40 may then be pulled away from housing 21. Due to the smaller, relative diameters of termination fitting 30 and sewer hose 22 within housing 21, rotation of cap 40 will only cause disengagement of cap 40 from housing 21 and will not disengage cap 40 from termination fitting 30. With cap 40 still attached to fitting 30, sewer hose 22 is withdrawn from housing 21 by pulling cap 40 over to sewage receptacle 13. Cap 40 is then removed from termination fitting 30 by grasping fitting 30 with one hand and twisting cap 40 off with the other. Fitting 30 is then inserted down into receptacle 13 for drainage. After drainage is complete, washwater or the like or special rinsing liquids can be poured or released from sink 57 or toilet 58 within RV 10 to rinse holding tank 14 and hose 22. The process is then reversed to restore and seal, in the storage position, sewer hose 22 with only minimal or no touching or handling of hose 22. If desired, immediately following drainage, a disinfecting chemical can be poured into the system, settling in the sealed hose. The user is thus exposed to the odors of the drainage hose only during actual removal of and application of end cap 40 to termination fitting 30.

Although the invention has been described for use with recreational vehicles, it is adaptable for any vehicular sewage draining application. Other examples where the present invention would be appropriate are trains, planes, boats, buses, vans and semi-trailer cabs.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A sewage draining device for use with a vehicle having an outlet coupling for the exit of sewage from within the vehicle, comprising:

a flexible, extendable sewer hose;

first coupling means for providing permanent fluid-tight relation between a first end of said hose and the outlet coupling;

a tubular housing suspended from said vehicle and fixed at a first end to said first coupling means;

a dual closure cap for sealing shut both said hose and said housing, whether said cap has second coupling means for connecting said cap in fluid-tight closing relation to the second end of said hose and has third coupling means, exterior of said second coupling means, for connecting said cap in closing relation with the second end of said housing;

wherein said second coupling means includes a second fitting connected to the second end of said hose, wherein said second coupling means includes first bayonet means extending from said fitting and from said cap for lockingly engaging and drawing said cap in fluid-tight, closing relation with said second fitting, and wherein said second coupling means further includes an O-ring disposed between the end of said second fitting and said cap and wherein said first bayonet means is sized to create fluid-tight sealing among said second fitting, said O-ring and said cap when the device is in a storage position;

wherein said third coupling means includes second bayonet means extending from the second end of said housing and from said cap for lockingly engaging and drawing said cap in closing relation with said housing; and, wherein said draining device has first and second positions, said first position being a storage position characterized by said hose being fully retracted within said housing and said dual closure cap removably coupled in fluid-tight, closing relation to a second end of said hose and coupled in closing relation to a second end of said housing, said second position being a drainage position characterized by said hose being substantially extended exterior of said housing with said dual closure cap being disengaged from said housing.

2. A sewage draining device for use with a vehicle having an outlet coupling for the exit of sewage from within the vehicle, comprising:

a flexible, extendable sewer hose;

first coupling means for providing permanent fluid-tight relation between a first end of said hose and the outlet coupling;

a tubular housing suspended from said vehicle and fixed at a first end to said first coupling means, a dual closure cap for sealing shut both said hose and said housing, wherein said cap has second coupling means for connecting said cap in fluid-tight closing relation to the second end of said hose and has third coupling means, exterior of said second coupling means, for connecting said cap in closing relation with the second end of said housing;

wherein said first coupling means includes a first fitting connected to the first end of said hose, wherein said first coupling means includes first bayonet means extending from said fitting and from the outlet coupling for lockingly engaging and drawing said first fitting in fluid-tight, closing relation with said outlet coupling, and wherein said first coupling means further includes an O-ring disposed between said fitting and said outlet coupling and wherein said first bayonet means is sized to create fluid-tight seal among said fitting, said O-ring and said outlet coupling; and, wherein said draining device has first and second positions, said first position being a storage position characterized by said hose being fully retracted within said housing and said dual closure cap being removably coupled in fluid-tight, closing relation to a second end of said hose and coupled in closing relation to a second end of said housing, said second position being a drainage position characterized by said hose being substantially extended exterior of said housing with said dual closure cap being disengaged from said housing.

* * * * *